United States Patent
Takatsuka

(10) Patent No.: US 8,483,859 B2
(45) Date of Patent: Jul. 9, 2013

(54) IMAGE PROCESSING DEVICE AND IMAGE PROCESSING METHOD

(75) Inventor: Hiromasa Takatsuka, Nara (JP)

(73) Assignees: OMRON Corporation, Kyoto (JP); Factory Vision Solutions Corporation, Osaka (JP)

( * ) Notice: Subject to any disclaimer, the term of this patent is extended or adjusted under 35 U.S.C. 154(b) by 345 days.

(21) Appl. No.: 13/028,699

(22) Filed: Feb. 16, 2011

(65) Prior Publication Data

US 2011/0224813 A1 Sep. 15, 2011

(30) Foreign Application Priority Data

Mar. 15, 2010 (JP) .................................. 2010-057348

(51) Int. Cl.
*G06F 19/00* (2011.01)
(52) U.S. Cl.
USPC .................................. 700/97; 347/9; 382/149
(58) Field of Classification Search
USPC .................................. 700/97; 347/9; 382/149
See application file for complete search history.

(56) References Cited

U.S. PATENT DOCUMENTS

| 8,011,747 | B2* | 9/2011 | Walmsley et al. | 347/9 |
|---|---|---|---|---|
| 2004/0126005 | A1* | 7/2004 | Duvdevani et al. | 382/149 |
| 2005/0111017 | A1* | 5/2005 | Takahashi et al. | 358/1.9 |
| 2006/0132516 | A1* | 6/2006 | Walmsley et al. | 347/9 |
| 2006/0164451 | A1* | 7/2006 | Pulver et al. | 347/12 |
| 2007/0262863 | A1* | 11/2007 | Aritsuka et al. | 340/539.22 |
| 2009/0054755 | A1* | 2/2009 | Shiibashi | 600/407 |
| 2010/0034484 | A1* | 2/2010 | Kido | 382/294 |
| 2010/0157041 | A1* | 6/2010 | Klaiman et al. | 348/77 |
| 2010/0172556 | A1* | 7/2010 | Cohen et al. | 382/128 |
| 2010/0228076 | A1* | 9/2010 | Blank et al. | 600/18 |

FOREIGN PATENT DOCUMENTS

JP 2007-026423 A 2/2007

* cited by examiner

*Primary Examiner* — Mohammad Ali
*Assistant Examiner* — Anthony Whittington
(74) *Attorney, Agent, or Firm* — Osha Liang LLP

(57) ABSTRACT

An image processing device is provided with a designating operation accepting unit which displays a setting screen on which an image indicating the entire shape of an object appears. The designating operation accepting unit accepts first, second, and third designating operations on the setting screen, and which allows selection of a process item. The first designating operation sets a common process sequence. The second designating operation sets a section-specific process sequence. The third designating operation designates a target section of a section-specific process. The common process sequence includes a process item by which the section-specific process is performed, and through this process item the common process sequence and each section-specific process sequence are associated with each other. Information indicating data in model data, and corresponding to the designated target section is associated with the section-specific process, and is then entered as section specifying information.

6 Claims, 12 Drawing Sheets

IMAGE PROCESSING DEVICE AND IMAGE PROCESSING METHOD

BACKGROUND OF THE INVENTION

1. Field of the Invention

The present invention relates to an image processing device, and an image processing method implemented in the image processing device. The image processing device captures an image of an object, and performs a plurality of processes including measurement on the object by using the image generated as a result of the image capture. The image processing device can change the substances of processes to be performed, and the order in which the processes are performed according to intended purposes.

2. Description of the Related Art

Image processing devices (generally called visual sensors) employed for measurement and inspection at a production site include those that perform only two-dimensional measurement by using images captured by cameras, and those with a function to perform three-dimensional measurement. According to a generally employed image processing device, a program created in consideration of a purpose of a process or the characteristics of an object is installed in the image processing device, so that the image processing device is allowed to perform a process specialized for the purpose of the process or the characteristics of the object.

And recently, a device provided with a general-purpose image processing device that can be used to attain a wide variety of purposes has been developed (see Japanese Patent Application Laid-Open No. 2007-26423). The developed device has a function of freely selecting process items to be performed from process items of a plurality of types and the order in which the processes are performed, and assembling a process sequence (called process flow) in response to the selection.

SUMMARY OF THE INVENTION

A larger number of industrial products have been formed in recent years the shapes of which are complicated as a result, for example, of importance attached to design. For measurement of such a complicated object, the target may be divided into a plurality of sections, and each of these sections may be subjected to a process by using an algorithm or a parameter suitable for the characteristics of the section. this method enhances a degree of process accuracy, compared to performing a uniform process throughout the object.

If it is hard to acquire the entire shape of an object, for example, if pieces in bulk are to be recognized, sections having their characteristic shapes may be separately defined as targets of recognition. If a section could be recognized with a high degree of accuracy, recognition accuracy can be maintained at a high level by employing the result of the recognition of that section.

In this regard, the disclosure of Japanese Patent Application Laid-Open No. 2007-26423 is premised on that the invention performs three-dimensional measurement, and a target section is specified by a process item prepared for two-dimensional measurement. Thereafter three-dimensional measurement is performed on the specified target section. However, this method is hard to apply to all objects.

Further, a general user does not find it easy to set various sections as process targets, and to set a process suitable for each of the sections.

In view of the problems described above, an object of the present invention is to make it possible to freely set a process sequence required for detailed measurement of each section according to the shape of an object, purposes of processes and the like, regardless of whether measurement to be performed is two-dimensional measurement or three-dimensional measurement. Another object of the present invention is to enhance operability of a user interface through which the setting of a process sequence is made.

An image processing device to which the invention is applied includes: process item registering means in which process items of a plurality of types and corresponding programs are registered, the process items and the programs being associated with each other; sequence storing means in which process sequences are stored, each process sequence including a plurality of process items selected from the process item storing means, the selected process items being arranged in a predetermined order; sequence setting means for setting a process sequence in response to a user's designating operation, and registering the process sequence into the sequence storing means; and sequence executing means for reading a process sequence from the sequence storing means, and executing programs in an order set in the process sequence that are associated with corresponding process items in the process sequence, thereby performing a plurality of processes including acquisition of an image of an object and measurement by using the acquired image.

In the aforementioned image processing device, process items of a plurality of types relating to measurement by using an image of the object may be registered in the process item registering means. One, or a plurality of process items relating to each of processes including correction of an image of a process target before measurement, judgment by using a measured value, and output of a result of the measurement and a result of the judgment, may be registered into the process item registering means. The process item registering means of the invention includes a section-specific process designating item entered as a process item. The section-specific process designating item determines that a section-specific process is to be performed on part of the object.

The image processing device of the invention further includes model storing means in which model data indicating the entire shape of a model of the object is registered, and section specifying information storing means in which section specifying information indicating data about part of the model data is stored. The sequence setting means and the sequence executing means are characterized as follows.

The sequence setting means includes designation accepting means and registration processing means. The designation accepting means displays a setting screen on which an image based on the model data registered in the model storing means appears. The screen allows the process items registered in the process item registering means to be selected. The designation accepting means accepts first, second and third designating operations. The first designating operation sets a common process sequence to be executed throughout the object. The second designating operation sets a section-specific process sequence relating to a section-specific process designating item in the common process sequence. The third designating operation designates a target section of the section-specific process by using the image based on the model data. The registration processing means forms a correlation through the section-specific process designating item between the common process sequence set by the first designating operation and the section-specific process sequence set by the second designating operation, and registers the common process sequence and the section-specific process sequence correlated to each other into the sequence storing means. The registration processing means also associates the section specifying information which indicates data in the model data and which corresponds to the target section designated by the third designating operation with the section-specific process designating item in the common process sequence, and registers the associated section specifying information into the section specifying information storing means.

The sequence executing means performs the process items one by one in the common process sequence registered in the sequence storing means. When the time comes to perform the section-specific process designating item in the common process sequence, the sequence executing means specifies measurement data about the target section from measurement data acquired as a result of a process item already performed by using section specifying information associated with the section-specific process designating item. Then, the sequence executing means executes the section-specific process sequence corresponding to the section-specific process designating item on the specified measurement data.

In the aforementioned configuration, a user can identify at least one section for which an individual measurement is required by referring to an image of the object in its entirety appearing on the setting screen. The user makes the first designating operation to set a common process sequence including a section-specific process designating item corresponding to sections. The user additionally makes the second designating operation to set a section-specific process sequence with a process item suitable for a section for which an individual measurement is required. The user also makes the third designating operation by using an image appearing on the setting screen to particularly designate a target section.

After these processes, the registration processing means forms a correlation through the section-specific process designating item between the common process sequence and the section-specific process sequence, and registers the common process sequence and the section-specific process sequence correlated to each other. The registration processing means also associates section specifying information which indicates data in the model data and corresponds to the target section of the section-specific process with the section-specific process designating item, and registers the associated section specifying information.

The sequence executing means performs processes by following the common process sequence. When the time comes to perform the section-specific process designating item, the sequence executing means executes a section-specific process sequence correlated to this section-specific process designating item. Before performing this section-specific process sequence, by using section specifying information associated with the section-specific process designating item to be performed, the sequence executing means acquires measurement data about the target section from measurement data acquired as a result of a process item already performed. Thus, as long as the common process sequence determines that a process item by which measurement data in a format corresponding to the format of the model data is acquired is to be performed before the section-specific process designating item, data corresponding to the section specifying information can be specified by using the measurement data acquired as a result of the measurement. As a result, measurement data about the target section is smoothly acquired. Accordingly, the accuracy in a section-specific process is maintained.

In an aspect of the aforementioned image processing device, the registration processing means provides the section-specific process designating item in the common process sequence, or a section-specific process sequence corresponding to the section-specific process designating item with a link with section specifying information registered in the section specifying information storing means, thereby associating the section specifying information and the section-specific process designating item with each other. Accordingly, when the time comes to perform the section-specific process designating item, the section specifying information can be acquired easily from the link.

In another aspect of the image processing device, the registration processing means registers the common process sequence and the section-specific process sequence, on condition that the common process sequence set by the first designating operation determines that a process item by which measurement data in a format corresponding to the format of the model data is acquired is to be performed before the section-specific process designating item. Thus, measurement data about a target section of a section-specific process is acquired stably during execution of a process sequence, so that there will be no problem in performing a process.

In still another aspect of the image processing device, the model storing means includes three-dimensional information about the three-dimensional shape of the object that is registered as model data. The designation accepting means displays a setting screen containing an image that is generated as a result of perspective transformation of the model data registered in the model storing means onto a virtual plane.

In this aspect, the user can identify a section for which an individual process is required by referring to the image generated as a result of the perspective transformation and which indicates the three-dimensional shape of the object, and designate the identified section. Further, a viewpoint of the perspective transformation may be changed in response to user's designation, and the indication of the image generated as a result of the perspective transformation may be changed accordingly. As a result, verification is realized with enhanced convenience.

As the third designating operation, a range including a section to be designated may be specified, or the specified range in its entirety may be designated as a section to be designated (part designation). Further, an operation may be made to designate a condition according to the characteristics of the shape of a target section. In this case, a section satisfying the condition may be extracted from the model data, and the extracted section may be set as a target section. If the registered model data is three-dimensional data, the foregoing condition may be a condition specific to three-dimensional data such as angular range of a normal direction.

It is desirable that the designation accepting means provide identifying indication of an image of a designated section that is part of an image of the object in its entirety in response to the third designating operation. It is also desirable that the designation accepting means confirm that the section given the identifying indication is a section to be designated in response to an operation to confirm the identifying indication. The acceptance of the operation to confirm the identifying indication avoids faulty designation, especially if the designation is to be made under the foregoing condition.

In still another aspect of the image processing device, the model data contains a plurality of segments each of which is an aggregate of a plurality of three-dimensional coordinates. The designation accepting means accepts designation of at least one segment as a target section of the section-specific process.

This aspect allows the user to easily designate a target section.

The invention is also applied to an image processing method that performs a sequence registering step and a sequence executing step. In the sequence registering step, a process sequence in which a plurality of process items selected from process item registering means are arranged in a predetermined order is set in response to a user's designating operation, and the process sequence is registered. In the process item registering means, process items of a plurality of types and corresponding programs are registered, the process items and the programs being associated with each other. In the sequence executing step, programs corresponding to the process items in the process sequence registered in the sequence registering step are executed in an order set in the process sequence, thereby performing a plurality of processes including acquisition of an image of an object and measurement by using the acquired image.

Three steps described below are performed in the sequence registering step.

In a first step, the setting screen is displayed. On the screen an image based on model data indicating the entire shape of the object appears, and the screen allows a plurality of process items including a section-specific process designating item determining that a section-specific process on part of the object is to be performed. A first designating operation to set a common process sequence to be executed throughout the object is accepted on a setting screen. As a result, the common process sequence is set that determines that a process item by which measurement data in a format corresponding to the format of the model data is acquired is to be performed before the section-specific process designating item.

In a next step, second and third designating operations are accepted on the aforementioned setting screen. The second designating operation sets a section-specific process sequence relating to a section-specific process designating item in the common process sequence. The third designating operation designates a target section of the section-specific process by using an image based on the model data.

In a final step, a correlation is formed through the section-specific process designating item between the common process sequence set by the first designating operation and the section-specific process sequence set by the second designating operation, and the common process sequence and the section-specific process sequence correlated to each other are registered. Further, section specifying information which indicates data in the model data and corresponds to the target section designated by the third designating operation is associated with a section-specific process designating item in the common process sequence, and the associated section specifying information is registered.

In the sequence executing step, the process items set in the common process sequence are performed one by one. When the time comes to perform the section-specific process designating item in the common process sequence, measurement data about the target section is specified from measurement data in a format corresponding to the format of the model data, by using section specifying information associated with the section-specific process designating item. Then, the section-specific process sequence corresponding to the section-specific process designating item is executed on the specified measurement data.

According to the present invention, a process sequence suitable for a process can be set for each section for which a section-specific process is required according to the shape of an object or a purpose of a process. This allows a process to be performed with a high degree of accuracy even if there is a plurality of target items of section-specific processes, or if different processes are to be performed on the target sections. Further, the process sequence set can be applied to a case where it is hard to recognize the entire shape of an object.

In order for a user to set a process sequence, the user sees an image appearing on a setting screen to easily know a section for which a section-specific process is required. The user can also easily designate a target section of the section-specific process through making a designating operation by using this image, thereby enhancing operability in setting a process sequence.

DETAILED DESCRIPTION OF THE PREFERRED EMBODIMENTS

Figure 1:
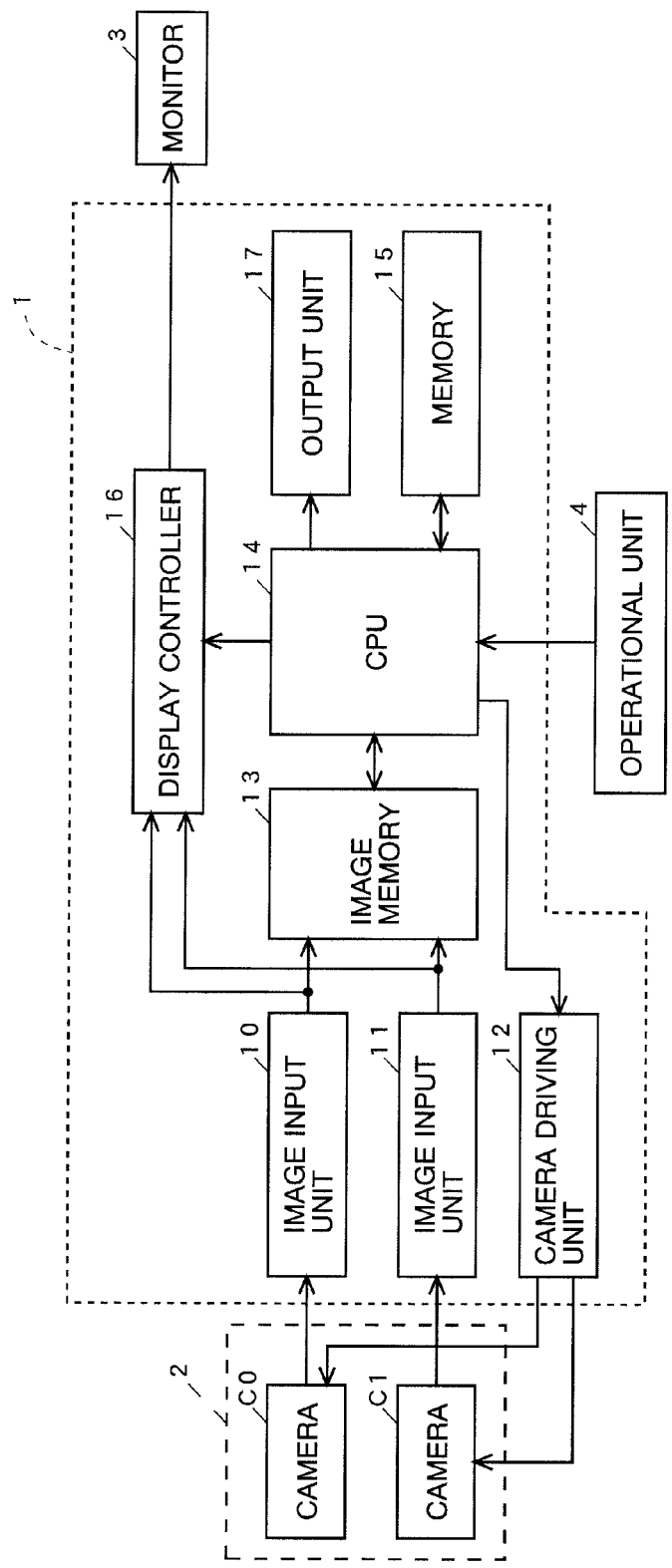
FIG. 1 is a block diagram showing an exemplary configuration of an image processing device.

FIG. 1 is a block diagram showing an exemplary configuration of an image processing device to which the invention is applied.

According to an embodiment, the image processing device is used to recognize a part held by a picking robot at a production site, to inspect a finished product or a finished part, and the like. The image processing device has a function of performing three-dimensional and two-dimensional measurement.

The configuration of the device will be described in detail with reference to FIG. 1.

The image processing device of the embodiment includes a processor 1 mainly composed of a CPU 14, an image capturing unit 2, a monitor 3, an operational unit 4, and the like, which are connected to each other. The image capturing unit 2 shown in FIG. 1 includes two cameras C0 and C1. The image capturing unit 2 may include another camera in addition to the cameras C0 and C1. The image capturing unit 2 may include only one camera if the image processing device performs only two-dimensional measurement.

The processor 1 includes image input units 10 and 11 for retrieving image signals from the cameras C0 and C1, respectively, a camera driving unit 12, an image memory 13, the CPU 14, a memory 15, a display controller 16, an output unit 17, and the like.

The camera driving unit 12 outputs a driving signal to each of the cameras C0 and C1 in response to instructions from the CPU 14. The image input units 10 and 11 retrieve image signals from the cameras C0 and C1 respectively, convert the retrieved image signals into digital form, generate digital images for measurement (hereinafter called "target images"), and stores the generated images into the image memory 13.

The CPU 14 processes a target image in the image memory 13, and performs two-dimensional or three-dimensional measurement, or performs both.

The output unit 17 is an output interface through which a result of measurement or judgment is output to an external device.

The display controller 16 receives a target image supplied from each of the image input units 10 and 11, generates display screen containing the received target image, and displays the generated display screen on the monitor 3. The display screen may contain indication of data about a processing result that is provided from the CPU 14.

In a setting mode of a process sequence described later, the display controller 16 receives the data from the CPU 14 to be displayed about a setting screen described below, and displays the setting screen on the monitor 3.

Figure 2:
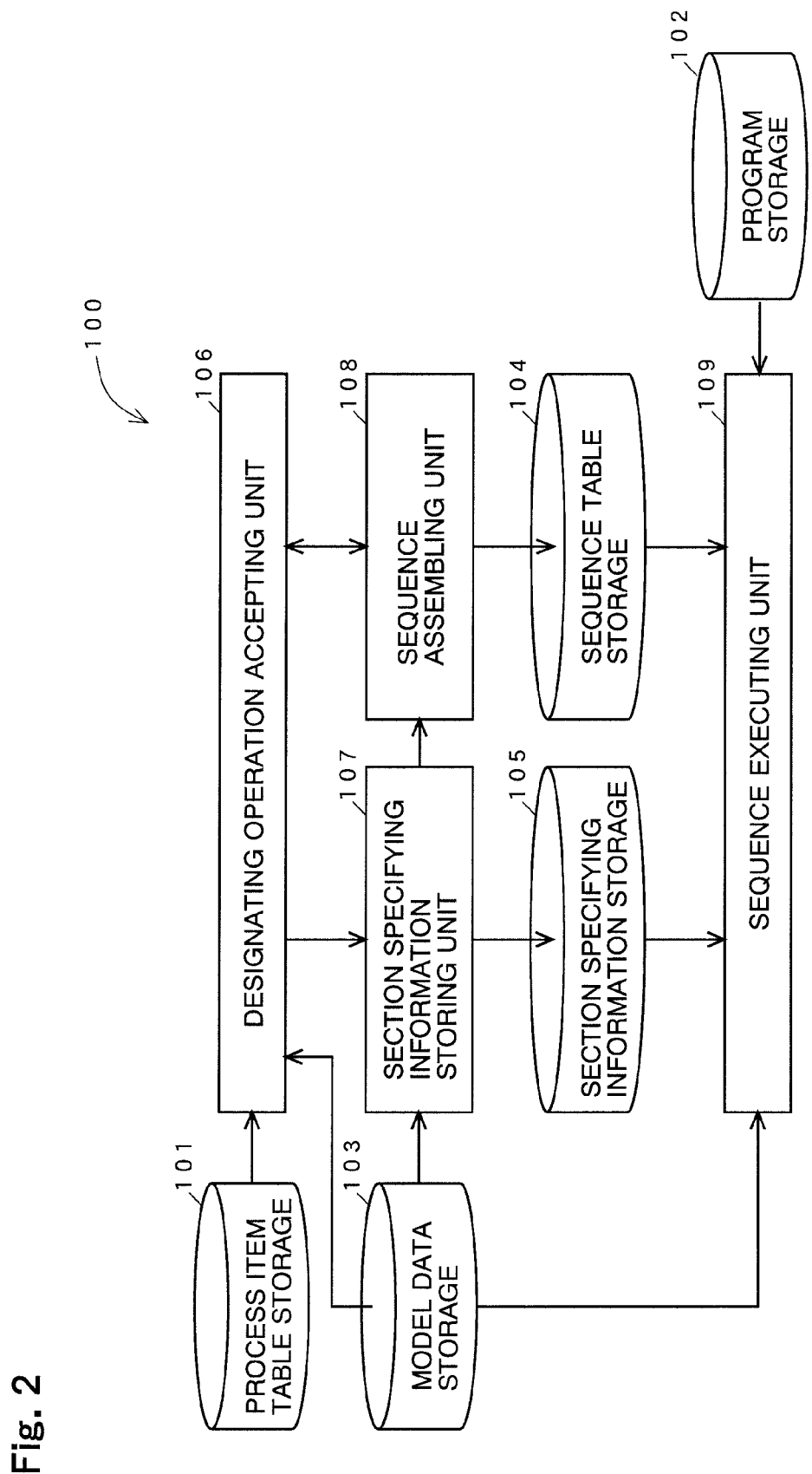
FIG. 2 is a functional block diagram showing an image processing system introduced in the image processing device shown in FIG. 1.

The memory 15 is a high-capacity nonvolatile memory such as a hard disk, and stores programs and data files for constituting an image processing system 100 described next, as shown in FIG. 2.

The CPU 14 functions as a designating operation accepting unit 106, a section specifying information storing unit 107, and a sequence assembling unit 108 shown in FIG. 2 to set a process sequence indicating a flow of a process applied commonly throughout an object (hereinafter called "common process"), and a process sequence indicating a flow of a process branching off the common process and which is applied to part of the object (hereinafter called "section-specific process"). The CPU 14 also functions as a sequence executing unit 109 shown in FIG. 2 to perform processes defined in a corresponding process sequence in a determined order.

Among the data files shown in FIG. 2, a process item table storage 101 stores a process item table. The process item table contains process items of a plurality of types that can be set in the foregoing process sequence. A program storage 102 stores programs used for performing these process items. The process items include those that define performance of two-dimensional measurement or recognition, and those that define performance of three-dimensional measurement or recognition.

Model data indicating the entire shape of an object targeted for measurement is registered into a model data storage 103. In a specific example given below, three-dimensional model data based on CAD data is registered into the model data storage 103. Alternatively, model data generated as a result of three-dimensional measurement of a model of a real object may also be registered into the model data storage 103. If only two-dimensional measurement is to be performed, a gray-scale image obtained by capturing an image of a model of a real object, and an image which is generated from the gray-scale image and includes extracted characteristics (such as an edge image, a binary image, and a quasi-image in which angle data indicating a direction of gradient of gray levels in pixels is defined), may be registered into the model data storage 103.

Process sequences set in response to a user's designating operation are registered into a sequence table storage 104. Section specifying informations indicating data in the model data, and which corresponds to a section designated by a user as a target of a section-specific process are entered into a section specifying information storage 105.

FIGS. 3 to 9 show specific examples of setting screens for process sequences.

In the embodiment, a process sequence to be set is expressed as a "process flow" that is an expression for a user, and designating operations to set process sequences are accepted by using three types of setting screens. The three setting screens include: a setting screen 201 shown in FIG. 3 on which the principal part of a process sequence (presented to a user by the name "Common Process Flow") is set; a setting screen 202 shown in each of FIGS. 4, 7 and 8 on which the algorithm of a section-specific process (presented to a user by the name "Selected Section Process Flow") is set; and a setting screen 203 shown in each of FIGS. 5, 6 and 9 on which a target section of a section-specific process is set.

In the below, the setting screens 201, 202, and 203 are called "common process setting screen 201," "section-specific process setting screen 202," and "target section setting screen 203," respectively. The common process setting screen 201 and the section-specific process setting screen 202 have substantially the same configuration, and accordingly, the elements therein are denoted by the same reference numerals. Only those functional buttons in the central portion on each screen that are referred to in the description below are denoted by reference numerals 21 to 27.

The setting screens 201 and 202 are alternately displayed as a result of push of an upper-left "Flow Switching" button 210. Each of the screens 201 and 202 includes a field 211 on the left side of the screen in which a process sequence being set appears, and a display field 212 on the right side of the screen in which process items are displayed. Functional buttons of a plurality of types are provided in the upper half of a central region of the screen. A field 213 in which an image of a model of an object appears is provided below the region in which the functional buttons are provided. A help menu call button 214, and a button 215 through which instructions to close the screen (to finish a setting process) are entered, are provided on the lower left of the screen.

Hereinafter, the aforementioned fields 211, 212, and 213 are called "sequence display field 211," "item display field 212," and "model display field 213," respectively. An image appearing in the model display field 213 is called "model image."

Process items of a plurality of types classified according to purposes of processes appear in a tree structure in the item display field 212. In the embodiment, after a click to select a process item in the item display field 212 is accepted, the process item selected by the click operation appears in the sequence display field 211. Selected process items are placed from the top down in the sequence display field 211, in the order in which the process items are selected. Process items are identified by numbers 0, 1, 2, . . . (in the below, called "sequence number") indicating the order in which the process items are selected.

The order in which process items are arranged can be changed where appropriate with buttons such as Go buttons 21 and 22 in the figures. Further, a newly selected process item can be added with an Insert button 23 between process items already arranged. Also, a process item in the sequence display field 211 may be duplicated with a Copy button 24 and a Paste button 25, so that the same process item can be set repeatedly. Or, some of process items can be deleted with a Delete button 26.

A model image M appearing in the model display field 213 is generated as a result of perspective transformation of the (three-dimensional) model data in the model data storage 103 shown in FIG. 2 through the image capturing surface of the camera C0 or C1. In response to designation of a target section of a section-specific process, the designated section of the model image M in the model display field 213 is magnified in a high-visibility color such as red and blue (in FIGS. 3 to 9, the high-visibility color is identified by extra-thick lines).

Figure 5:
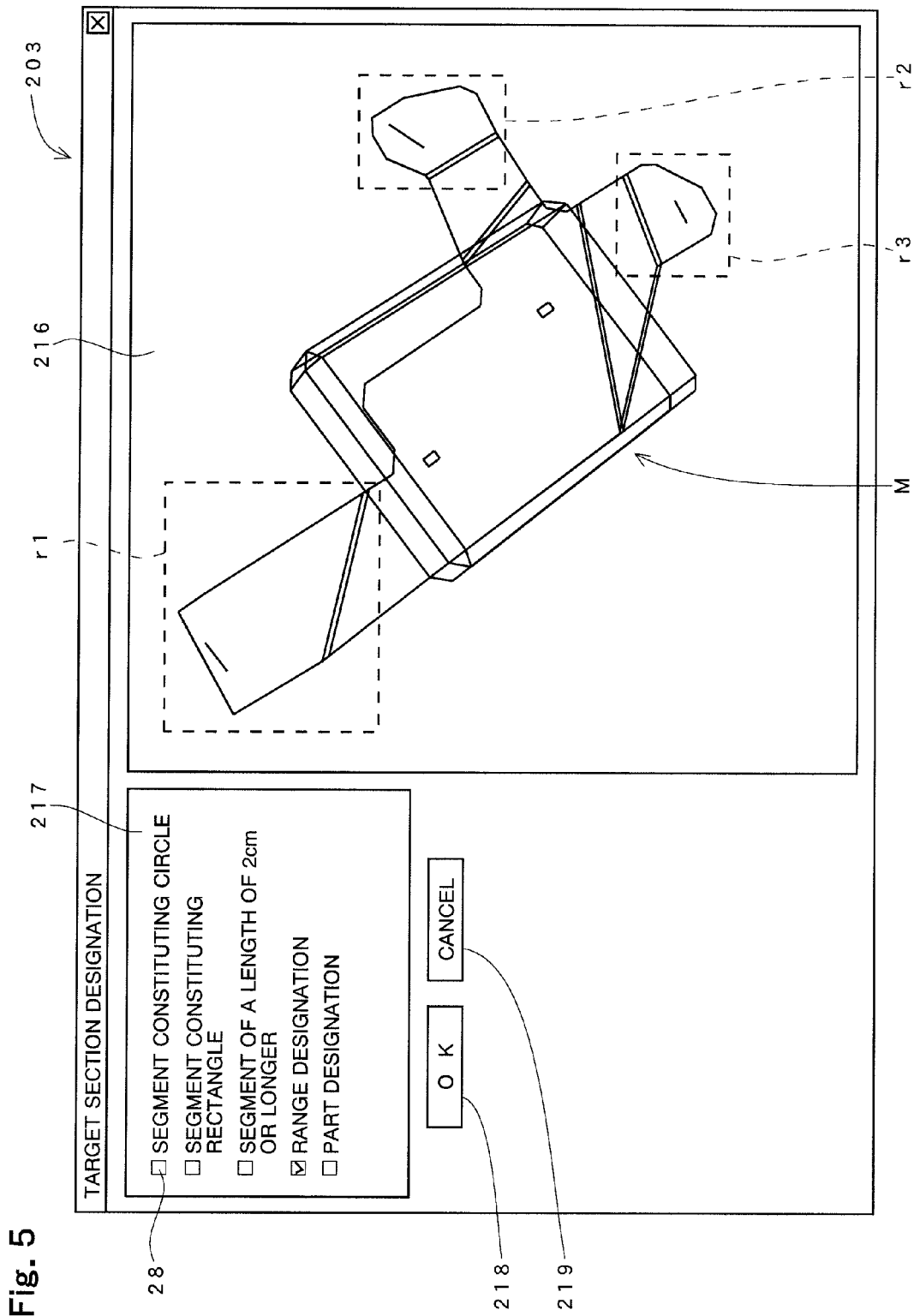
FIG. 5 is a diagram showing an exemplary configuration of a target section setting screen and an exemplary designating operation on a model image.
Figure 6:
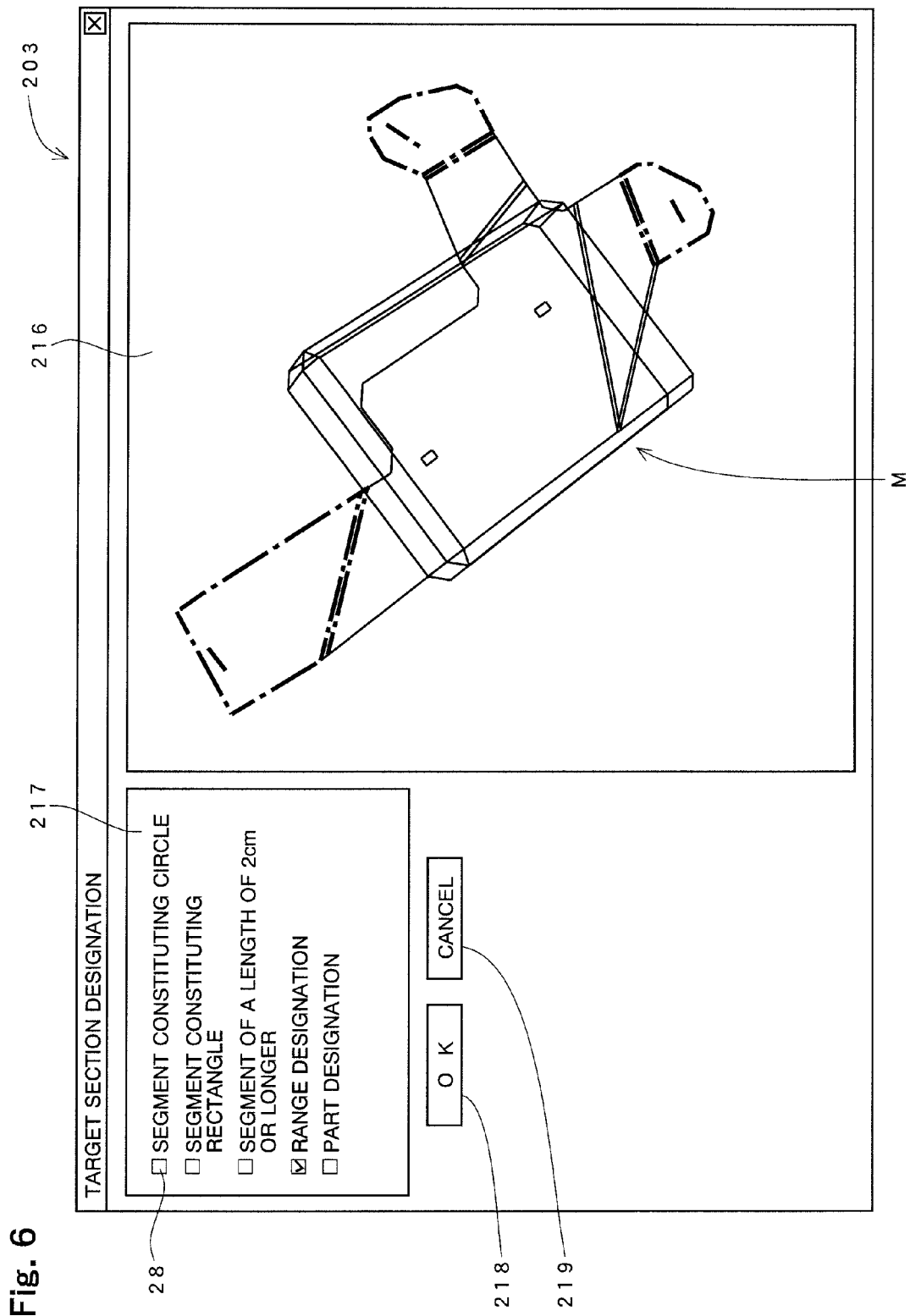
FIG. 6 is a diagram showing a screen in a state after the designating operation is reflected in the target section setting screen shown in FIG. 5.
Figure 9:
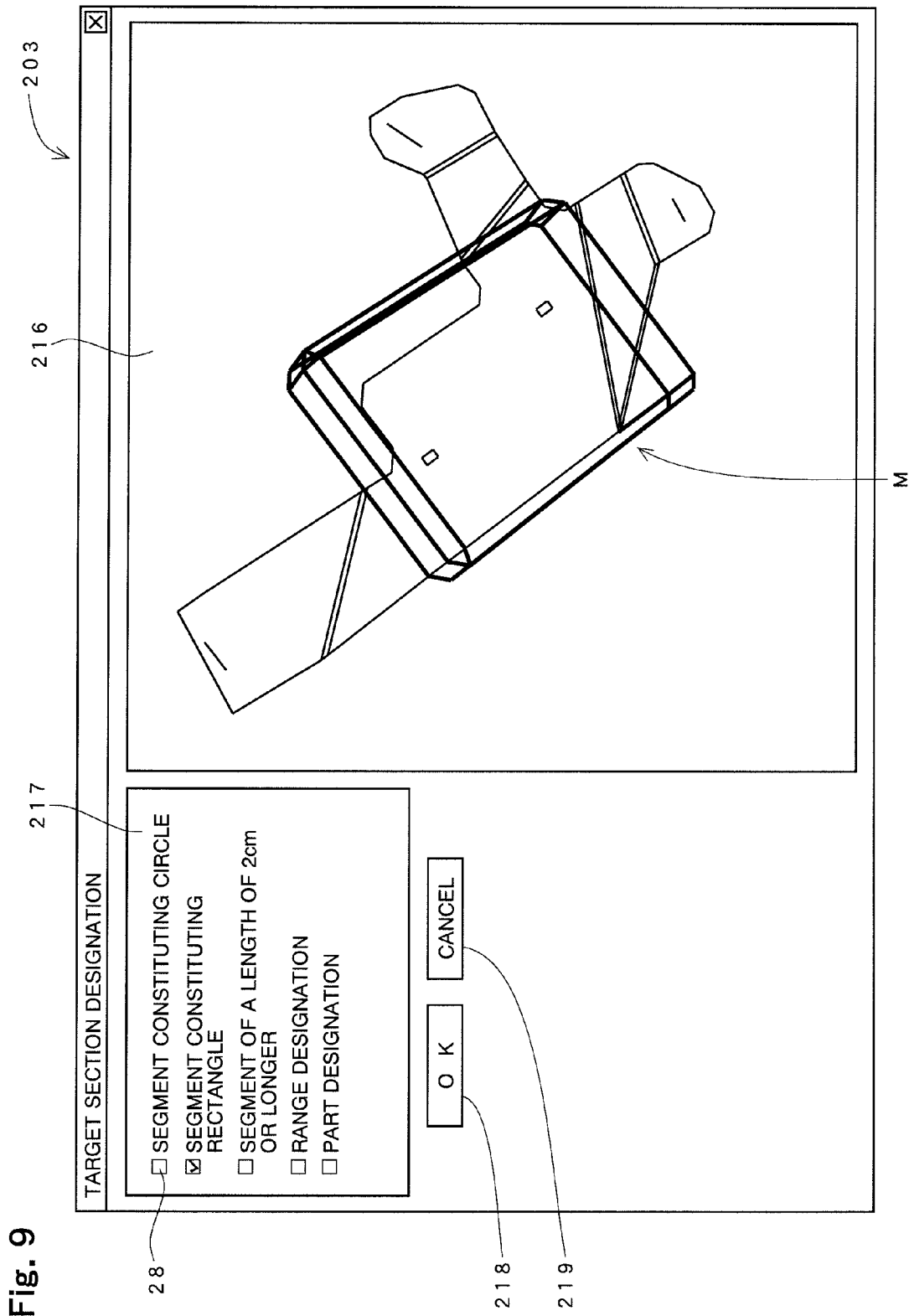
FIG. 9 is a diagram showing a state after designation is accepted on a target section setting screen that corresponds to the section-specific process setting screen shown in FIG. 8.

The target section setting screen 203 shown in each of FIGS. 5, 6 and 9 is called up in response to double click on the model display field 213 on the section-specific process setting screen 202, and is displayed while overlapping the section-specific process setting screen 202.

The target section setting screen 203 includes a region 216 in which the model image M appears in an enlarged manner. The target section setting screen 203 also includes a field 217 in which a condition for section designation is selected, an OK (Enter) button 218, and a Cancel button 219, which are on the left side of the region 216. Although not shown, in the embodiment, a viewpoint or line or sight of perspective transformation is changed in response, for example, to drag-and-drop of a mouse operation within the region 216. As a result, a display style of the model image M can be changed in various ways.

The embodiment is premised on that model data contains a plurality of three-dimensional parts called "segments" (each of which is an aggregate of a plurality of three-dimensional coordinates), and a target section is designated in units of segments. Accordingly, the field 217 contains five alternatives with corresponding check boxes 28 relating to a method of segment designation. The first to third alternatives are prepared to narrow down a target segment with the characteristics of a section to be designated. The remaining two alternatives include "Range Designation" and "Part Designation." Selecting "Range Specification" means that segments in a designated range are set as process targets. Selecting "Part Designation" means that a designation of a specific segment is accepted.

Figure 10:
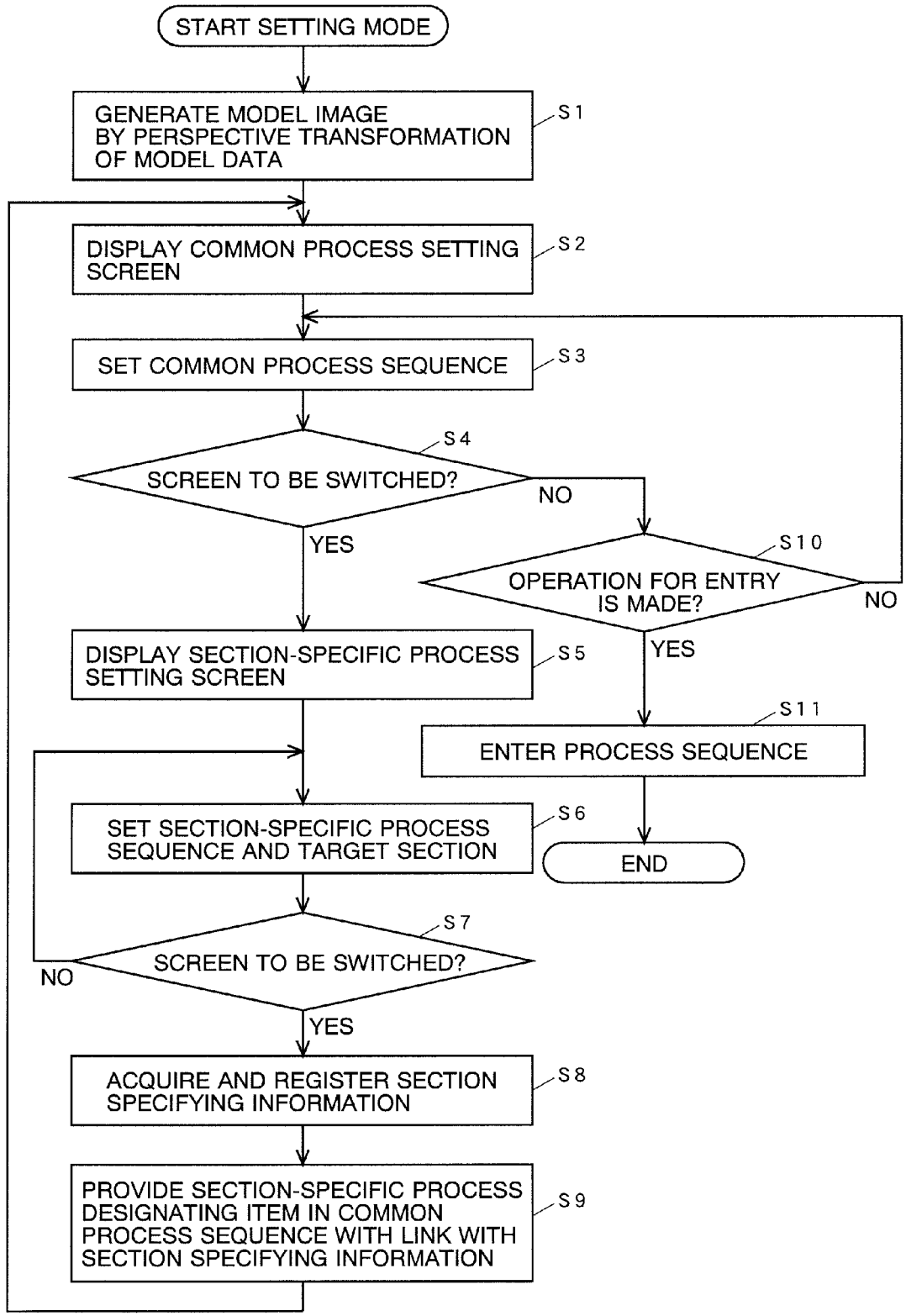
FIG. 10 is a flow chart for explaining a procedure employed in a setting mode.

FIG. 10 shows a procedure in the setting mode by using the aforementioned setting screens 201 to 203 (followed by the designating operation accepting unit 106, the section specifying information storing unit 107, and the sequence assembling unit 108 shown in FIG. 2). A user's operation in the setting mode, and a process performed in response to the user's operation will now be described by following a flow shown in this flow chart and where appropriate, by referring to the specific examples of the setting screens 201 to 203 shown in FIGS. 3 to 9.

Steps S1 and S2 in the setting mode are performed by the designating operation accepting unit 106. In step S1, model data is read from the model data storage 103, and then perspective transformation on the read model data is performed, thereby generating the model image M (step S1). Then, the common process setting screen 201 is opened on which the model image M appears in the model display field 213 (step S2). On the common process setting screen 201 immediately after the opening, the sequence display field 211 is blank, and the model image M in the model display field 213 has no identifying indication to show a target section.

Step S3 is performed by the cooperation of the designating operation accepting unit 106 and the sequence assembling unit 108. In step S3, operations to select process items in the process item display field 212, and operations of the functional buttons are accepted on the common process setting screen 201, and the process items selected as a result of the operations are arranged in a designated order, thereby assembling a common process sequence. The contents of the sequence display field 211 are updated in response to each assembly.

Figure 3:
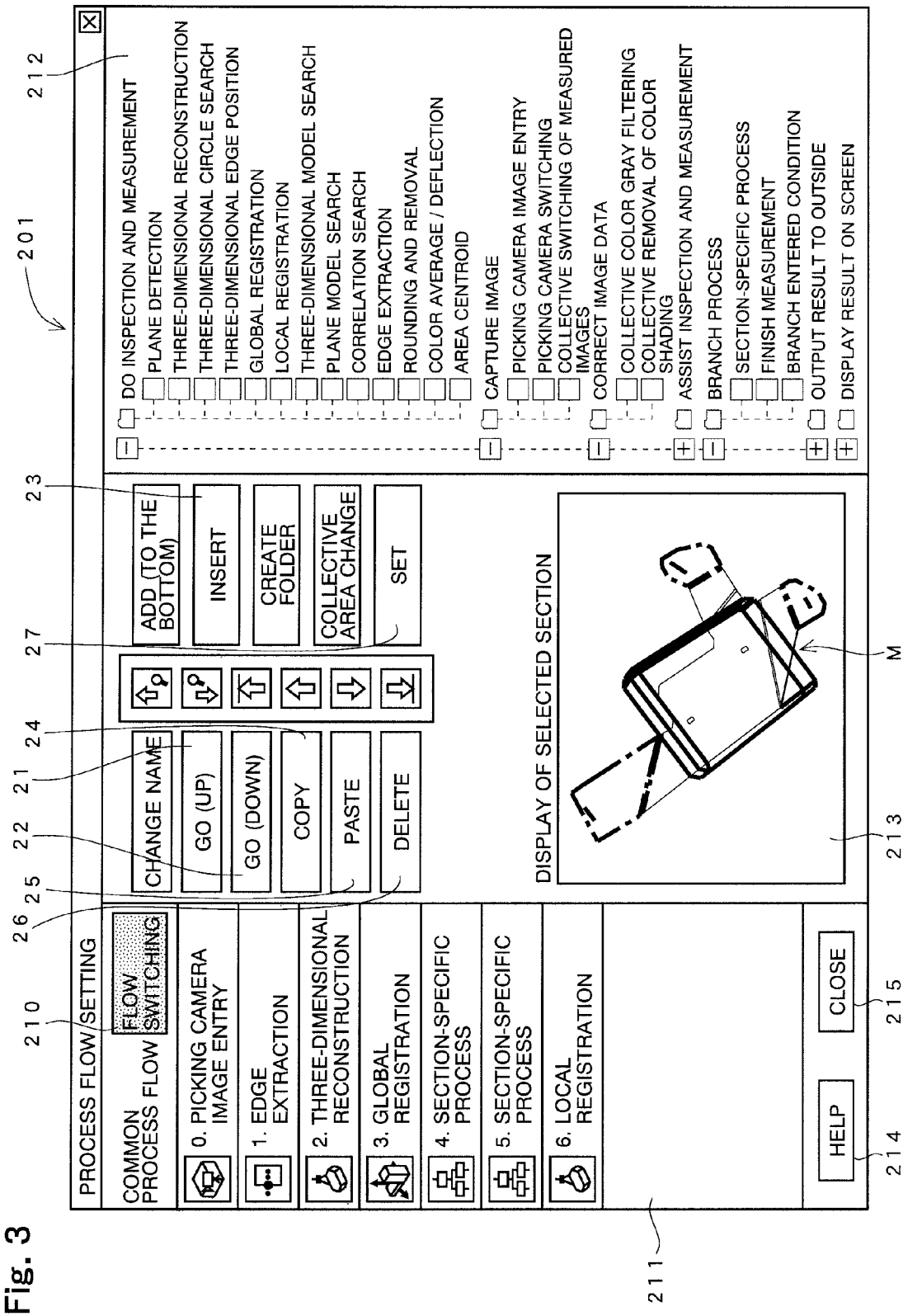
FIG. 3 is a diagram showing an exemplary configuration of a common process setting screen and exemplary setting of a common process sequence.

The sequence display field 211 on the common process setting screen 201 shown in FIG. 3 contains seven process items. As clearly seen from the correlation with these process items in a tree structure in the item display field 212 on the right side, these seven process items include a zeroth process item "Picking Camera Image Entry" relating to "Image Capturing Process," namely relating to image capture. First to third, and sixth process items "Edge Extraction," "Three-Dimensional Reconstruction," "Global Registration," and "Local Registration" indicate specific processes relating to inspection and measurement.

"Global Registration" is a process in which three-dimensional information about an object reconstructed as a result of the previous process "Three-Dimensional Reconstruction" is compared with model data to roughly recognize the position and the posture of the object. "Local Registration" is a process in which the position and the posture of the object are recognized in more detail on the basis of a result of each section-specific process performed before "Local Registration."

Fourth and fifth process items "Section-Specific Process" mean branching of the sequence into section-specific processes, namely mean that processes specialized for part of the object are to be performed. The process item "Section-Specific Process" corresponds to a "section-specific process designating item" in "SUMMARY OF THE INVENTION." In the common process sequence, only the timing of a section-specific process is determined, and the specific substance of the section-specific process is not determined. The specific substance of the section-specific process is determined on the setting screen 202.

After selecting some process items including the section-specific processes, the user pushes the switching button 210 with one of the section-specific processes in the sequence display field 211 selected. Then, a result of step S4 shown in FIG. 10 becomes "YES," so that the flow proceeds to step S5 in which a screen to be displayed is switched to the section-specific process setting screen 202. Next, a section-specific process sequence and a target section are set (in step S6) by using the setting screen 202 and the target section setting screen 203.

In step S6, operations to select process items, and operations to determine the order in which the processes are performed are accepted on the section-specific process setting screen 202 in the same way as that in the operations on the common process setting screen 201. Next, a section-specific process sequence is assembled, and then the assembled sequence appears in the sequence display field 211. If "Section-Specific Process" is selected on the section-specific process setting screen 202, the selection is canceled. Further, the target section setting screen 203 is opened in response to double click on the model display field 213, so that designation of a target section is accepted.

FIGS. 4 to 7 show transition of screens during step S6 that is performed in relation to the fourth process item "Section-Specific Process" in the sequence display field 211 on the common process setting screen 201 shown in FIG. 3. The section-specific process setting screen 202 shown in FIG. 4 appears immediately after a screen to be displayed is switched from the common process setting screen 201. On the section-specific process setting screen 202 at this stage, the sequence display field 211 is blank, and the model image M in the model display field 213 has no identifying indication.

Figure 4:
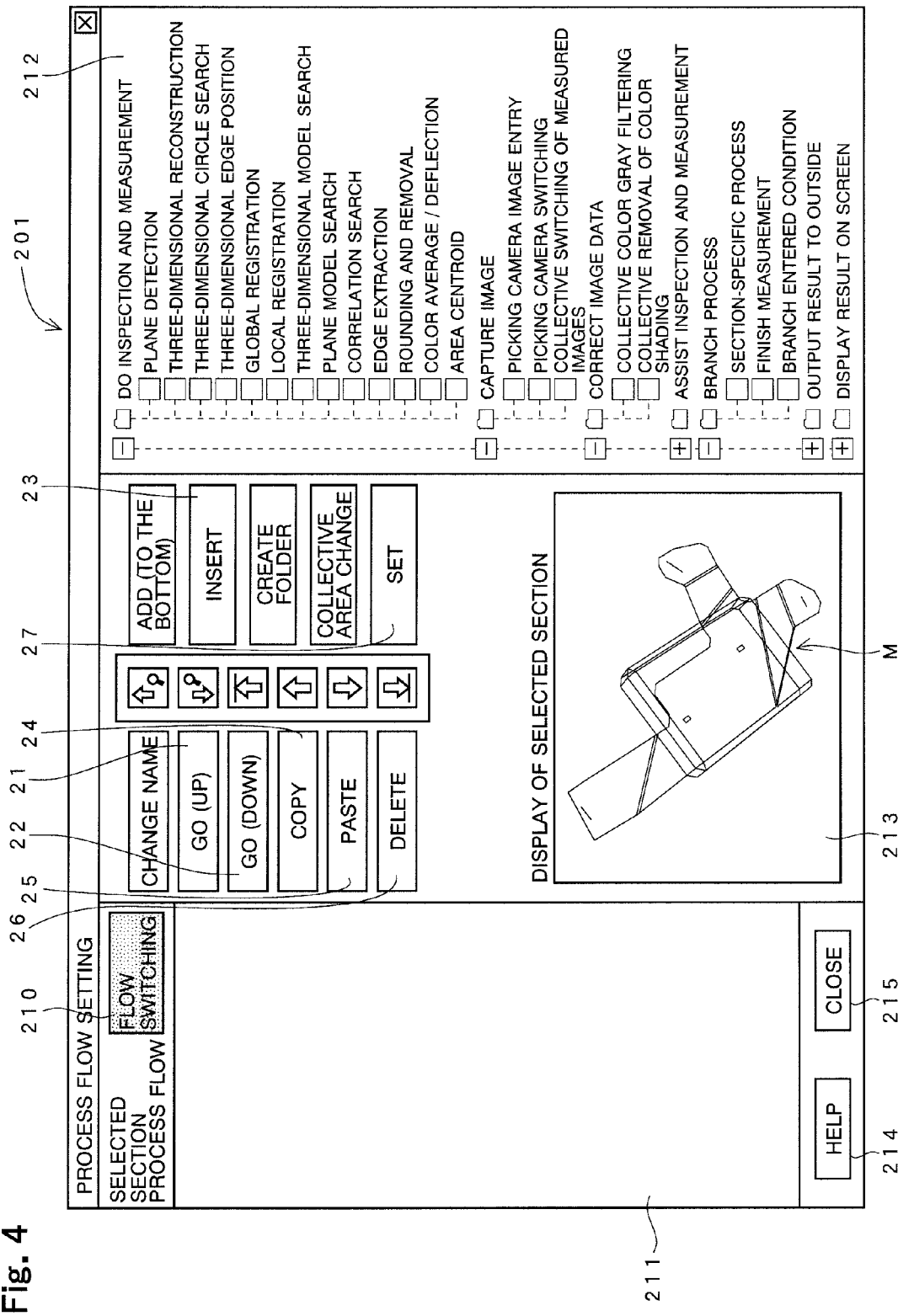
FIG. 4 is a diagram showing the configuration of a section-specific process setting screen in a state immediately after its opening.

The target section setting screen 203 shown in FIG. 5 is called up in response to an operation on the section-specific process setting screen 202 shown in FIG. 4, and which is in a state after an operation to designate a target section is made. In this example, "Range Specification" is selected in the upper-left field 217, and three places of the model image M in the region 216 are specified in frames r1, r2 and r3. If the user pushes the OK button 218 on the screen, segments completely surrounded by the frames r1, r2 and r3 are set as target sections. In response, the places set as the target sections are identified in high-visibility color (places indicated by alternate long and short dashed lines in FIG. 5). If the user pushes the OK button 218 again, or makes an operation to close the target section setting screen 203 in this state, designation of a target section is finished.

Figure 7:
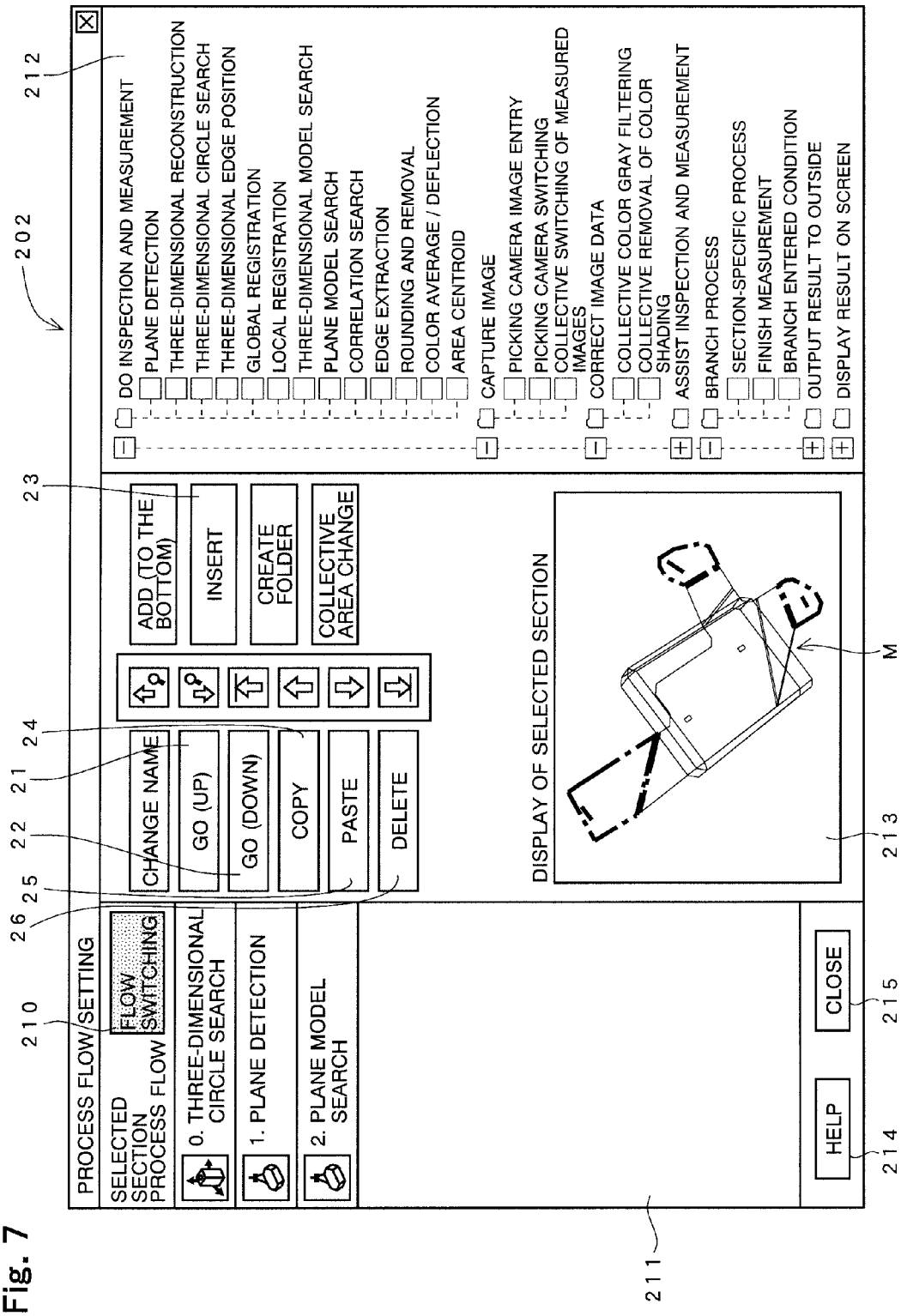
FIG. 7 is a diagram showing an exemplary section-specific process setting screen at the time when setting is finished.

The section-specific process setting screen 202 shown in FIG. 7 is in a state after the setting operations shown in FIGS. 5 and 6 are made, and after process items are set. In the example shown in FIG. 7, process items of three types relating to inspection and measurement are set to form a section-specific process sequence. These process items are identified by sequence numbers 0, 1 and 2. All process items except "Section-Specific Process" can be selected on the setting screen 202. The number of process items to be selected, and the order of selection can freely be determined on the setting screen 202.

Figure 8:
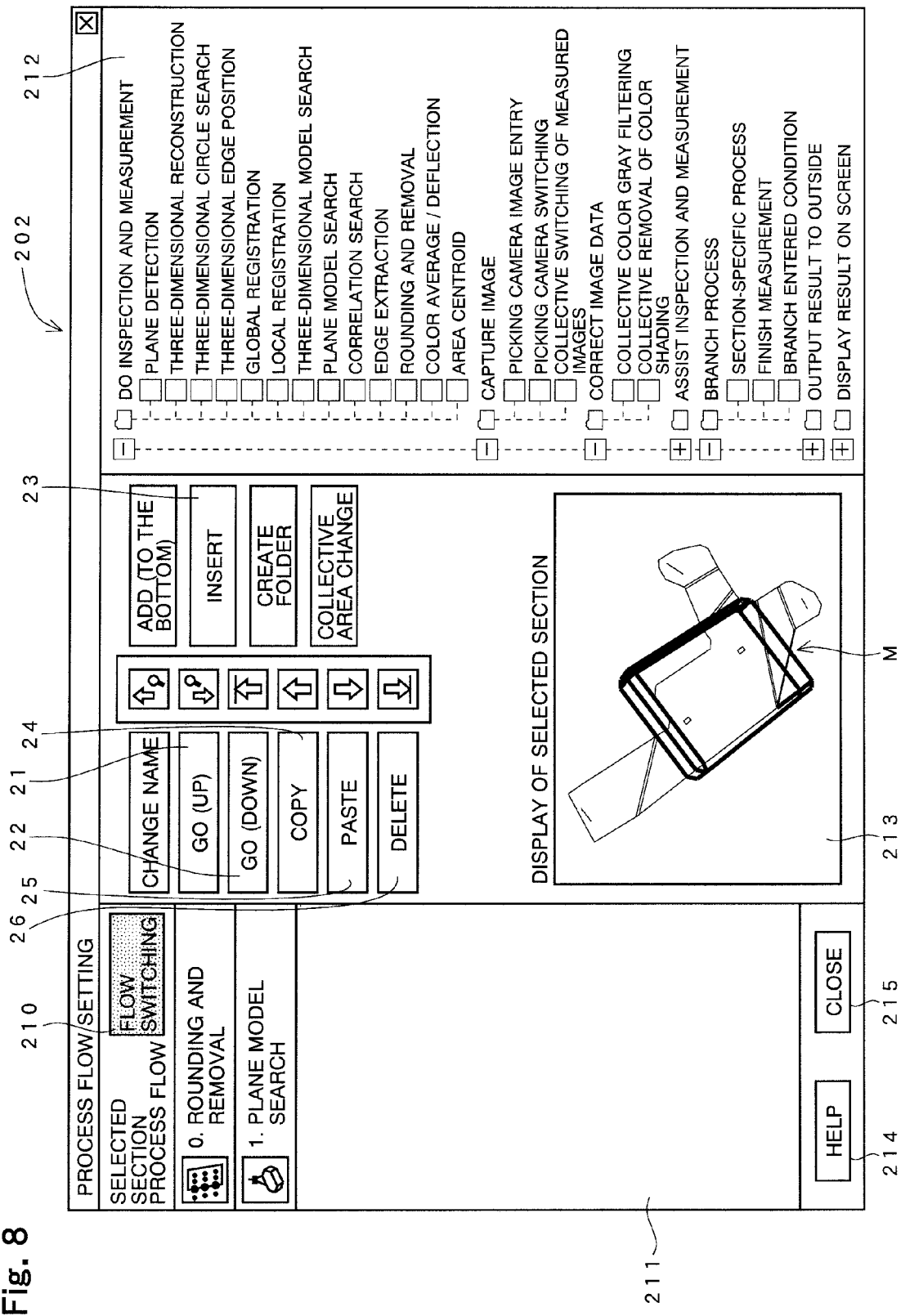
FIG. 8 is a diagram showing another exemplary section-specific process setting screen at the time when setting is finished.

FIGS. 8 and 9 show the setting screens 202 and 203, respectively, that relate to the setting of the second "Section-Specific Process" (fifth process item) shown in FIG. 3 (these setting screens 202 and 203 are both at a stage after the setting is finished).

The user selects "Segment Constituting Rectangle" and then pushes the OK bottom 218, so that segments satisfying the selected condition are extracted from the model data, and the extracted segments are identified in certain color (by extra-thick lines) on the target section setting screen 203 shown in FIG. 9. The substance of the process sequence set on the section-specific process setting screen 202 of FIG. 8 differs from that of the process sequence shown in the example of FIG. 7.

As described above, a user can freely set the substance of a process sequence and a target section for each section-specific process. The description given above continuously explains the setting relating to the fourth section-specific process, and the setting relating to the fifth section-specific process. However, an actual processing is that each time setting relating to one section-specific process is finished, an operation is made to switch a screen to the common process setting screen 201. A result of step S7 shown in FIG. 10 becomes "YES" in response to the switching operation. Next, in step S8, information indicating segments corresponding to the target sections set on the target section setting screen 203 is acquired as section specifying information. The acquired information is then registered into the section specifying information storage 105. As an example, if a label is affixed to each segment of the model data, the label of each segment in a target section may be registered as section specifying information. As another example, three-dimensional information about a segment corresponding to a target section may be extracted from the model data, and the extracted information may be registered as section specifying information.

When step S8 is performed, the item "Section-Specific Process" set in the common process sequence is given link information in step S9 such as an address in which the aforementioned section specifying information is stored. Next, the flow returns to step S2, thereby a state where a common process setting screen is displayed.

After a screen displayed returns to the common process setting screen, the common process sequence can be set again. Further, a section-specific process designating item may be added. In this case, the section-specific process setting screen 202 and the target section setting screen 203 may be opened to set a process sequence.

FIG. 3 described above shows a state where the sixth process item (local registration) is selected after the aforementioned settings relating to the fourth and fifth section-specific processes are finished and the common process setting screen 201 appears again.

After all necessary settings are made, the user pushes a Set button 27 on the common process setting screen 201. The designating operation accepting unit 106 accepts this user's operation, and transfers the accepted operation to the sequence assembling unit 108. Then, the sequence assembling unit 108 enters the process sequence formed as a result of the past designating operations into the sequence table storage 104.

Although not shown in FIG. 10, before registering the process sequence, the sequence assembling unit 108 follows the process items in the common process sequence one by one to check to see if the following definition is established. This definition requires that a process in which an image of an object is captured, and measurement data in a format corresponding to the format of the model data (data capable of being compared with the model data) is acquired is performed before the section-specific processes. If determining that this definition is established, the sequence assembling unit 108 registers the process sequence. If determining that this definition is not established, the sequence assembling unit 108 does not register the process sequence, and outputs an error code to the designating operation accepting unit 106.

The designating operation accepting unit 106 displays an indication such as an error message on the common process setting screen 201 being displayed in response to the error code. The user appropriately corrects the process sequence in the sequence display field 211 in response to the indication, and pushes the Set button 27 again. Then, the sequence assembling unit 108 checks the corrected process sequence for its appropriateness, and thereafter registers the process sequence.

Figure 11:
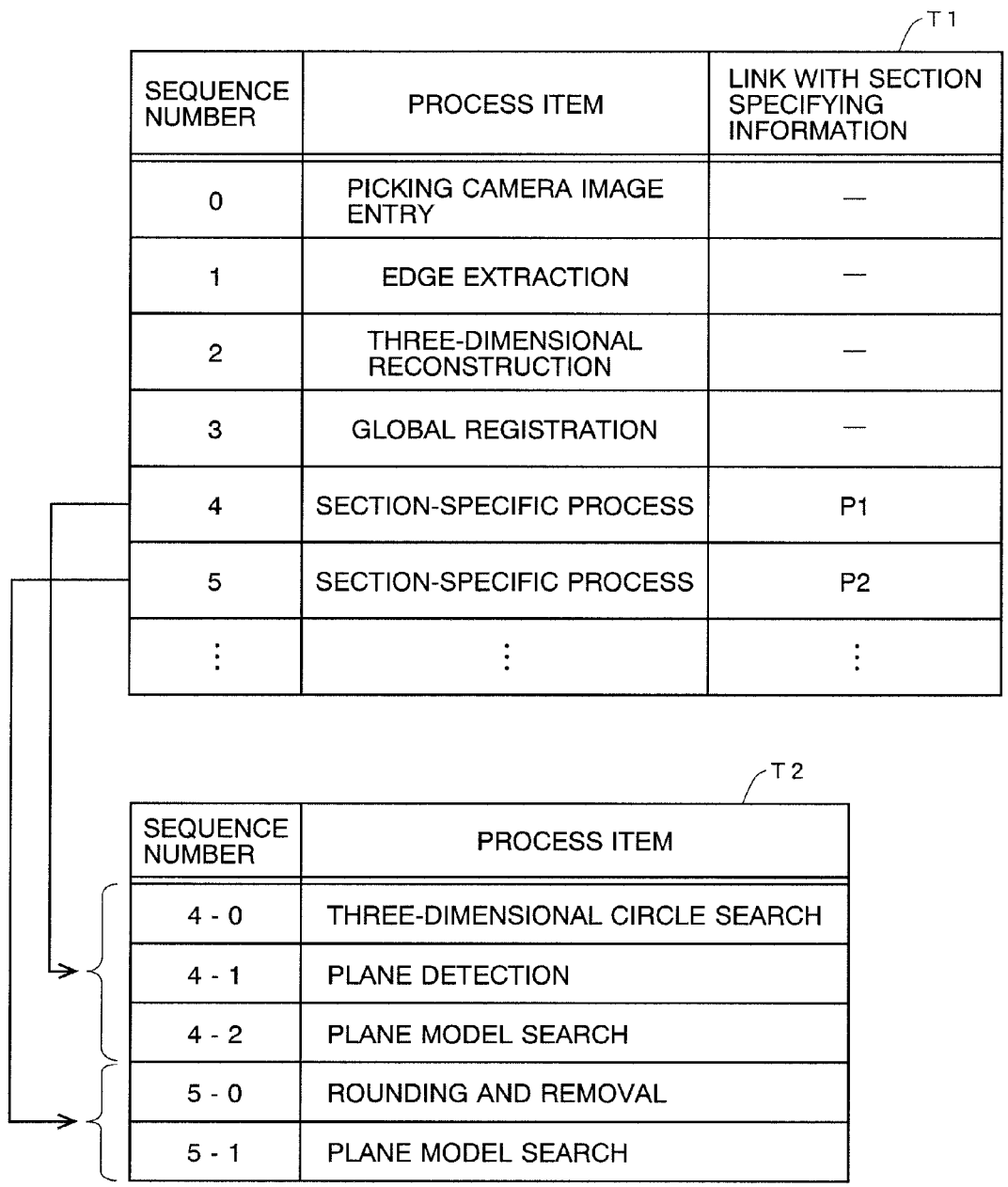
FIG. 11 is a diagram showing exemplary configurations of sequence tables.

FIG. 11 shows exemplary sequence tables that are the process sequences set on the setting screens shown in FIGS. 4 to 9.

The example of FIG. 11 includes a common process sequence table T1 and a section-specific process sequence table T2 that are separately provided. Each of the tables T1 and T2 contains sequence numbers and selected process items that are correlated to each other. The section-specific process sequence table T2 contains sequence numbers including sub-numbers that are added to the sequence numbers of corresponding process items (section-specific items) in the common process sequence. As a result of this number setting, in order to perform the fourth and fifth section-specific processes in the common process sequence, process items set in the corresponding section-specific processes are read one by one by referring to the section-specific process sequence table T2 with the corresponding sequence numbers. Then, the fourth and fifth section-specific processes are performed.

The section-specific processes in the common process sequence table T1 are given link information P1 and P2 correlated to the section-specific processes. The link information P1 and P2 show linkage with section specifying information that are registered into the section specifying information storage 105 when target sections of these section-specific processes are set. More specifically, the link information P1 and P2 may be the names of files of the corresponding section specifying information, or addresses in which these files are stored.

Figure 12:
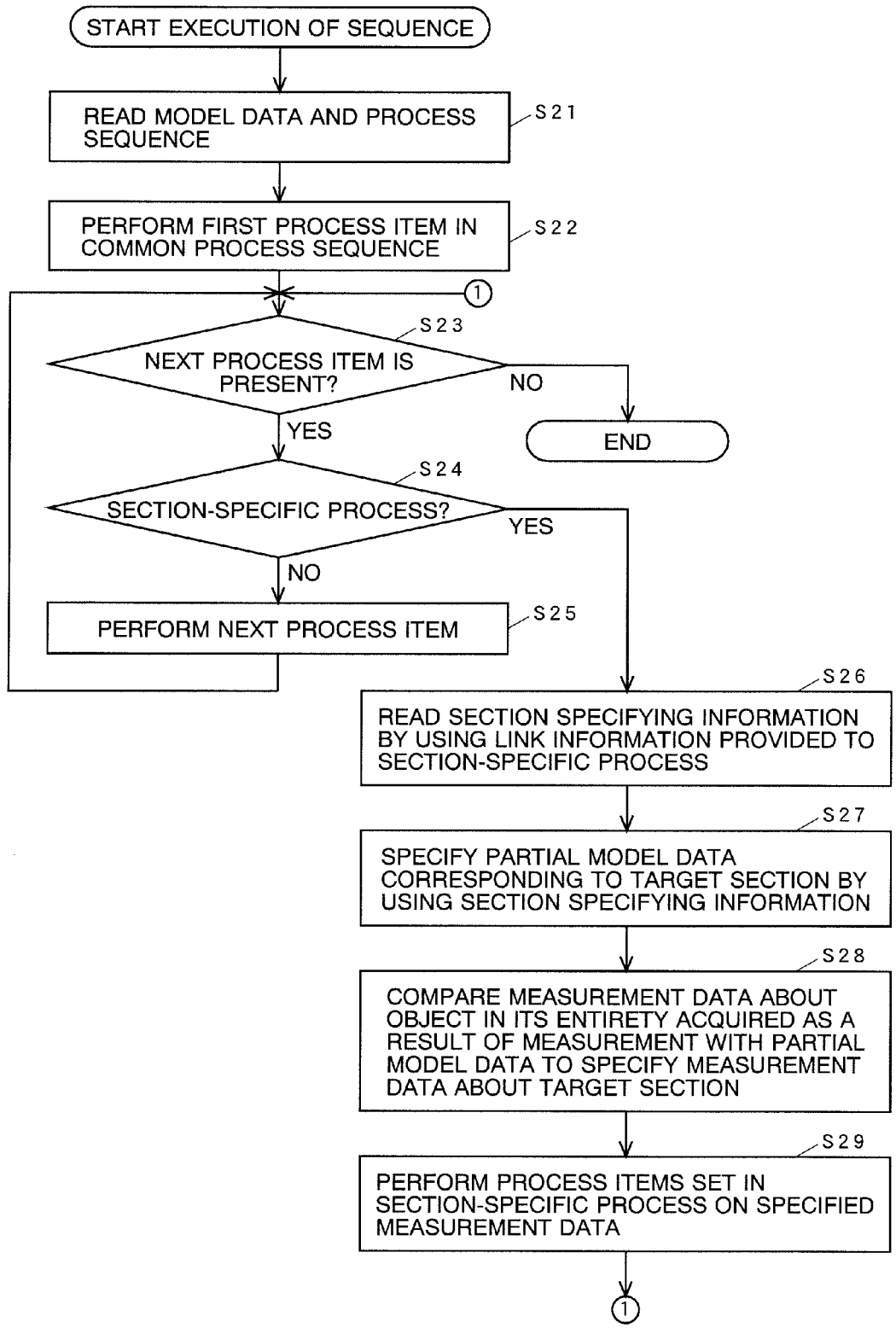
FIG. 12 is a flow chart showing a procedure employed when a process sequence is executed.

FIG. 12 shows a procedure employed when the sequence executing unit 109 executes the process sequences registered in the aforementioned setting mode.

In this procedure, model data is read first from the model data storage 103, and a process sequence corresponding to the read model data (combination of the common process sequence table T1 and the section-specific process sequence table T2) is read thereafter (step S21).

Next, a first process item set in the common process sequence table T1 is performed (step S22). Then, the presence or absence of a next process item is determined. If a process item other than a section-specific process is set as a second process item (if a result of step S23 is "YES" and a result of step S24 is "NO"), the second process item is performed (step S25).

The appropriateness of a process sequence is determined before the process sequence is registered. Accordingly, executing the registered process sequence means that a process item (item relating to image capture and measurement) by which measurement data in a format corresponding to the format of the model data is acquired is always performed before a section-specific process. Accordingly, a loop of steps S23, S24 and S25 is executed several times to acquire measurement data before an initial section-specific process is performed. When the time comes to perform a section-specific process, a result of step S24 becomes "YES" to perform each of steps S26 to S29.

In step S26, the section specifying information storage 105 is accessed with link information given to a section-specific process to be performed to read corresponding section specifying information therefrom. In step S27, data in the model data and which corresponds to a target section (hereinafter called "partial model data") is specified by using the read section specifying information.

In step S28, measurement data about an object in its entirety acquired as a result of previous measurement is compared with the partial model data to specify measurement data about the target section. In step S29, based on the sequence number of the section-specific process about to be performed, process items corresponding to this section-specific process are read one by one from the section-specific process sequence table T2. Then, the read process item is performed on the measurement data specified in step S28.

Steps S26, S27 and S28 are performed each time a section-specific process set in the common process sequence is about to be performed. This means that step S29 is performed after measurement data about a process target is specified, so that a target section of a section-specific process is measured with a high degree of accuracy.

In the common process sequence, measurement of an object, and comparison of measurement data acquired as a result of the measurement with model data (global registration shown in FIG. 3) may be performed before a section-specific process. In this case, steps S27 and S28 in the procedure shown in FIG. 12 are not performed. Instead, the model data is placed in a position and a posture recognized as a result of the global registration. Then, based on a relationship between the model data and section specifying information, measurement data corresponding to a segment constituting the section specifying information is specified as a process target. It is desirable that, in consideration of recognition error generated during the global registration, measurement data to be extracted cover a range slightly wider than that corresponding to section specifying information.

Like in this case, if measurement data and model data should always be compared, a correlation of a target section designated on the target section setting screen 203 with the model data may be entered as section specifying information.

In the image processing device described above, if there is a need of measuring an object of a complicated shape, the object may be divided into a plurality of sections according to the characteristics of the shape, and a section-specific process may be set for each section that is suitable for the shape of the corresponding section. Therefore, accurate measurement is realized. If the image processing device is used to recognize an object the entire shape of which is hard to recognize, for example, to recognize an object used for picking, section-specific processes may be set for a plurality of sections of their characteristic shapes, respectively. Then, based on a result of recognition about at least one section the measurement data about which is acquired successfully, recognition accuracy is maintained at high level.

What is claimed is:

1. An image processing device comprising:
   process item registering means in which process items of a plurality of types and corresponding programs are registered, the process items and the programs being associated with each other;
   sequence storing means in which process sequences are stored, each process sequence including a plurality of process items selected from the process item storing means, the selected process items being arranged in a predetermined order;
   sequence setting means for setting a process sequence in response to a user's designating operation, and registering the process sequence into the sequence storing means;
   sequence executing means for reading a process sequence from the sequence storing means, and executing programs in an order set in the process sequence that are associated with corresponding process items in the process sequence, thereby performing a plurality of processes including acquisition of an image of an object and measurement by using the acquired image;
   model storing means in which model data indicating an entire shape of a model of the object is registered; and
   section specifying information storing means in which section specifying information indicating data about part of the model data is stored, wherein
   the process item registering means includes a section-specific process designating item entered as a process item, the section-specific process designating item determining that a section-specific process is to be performed on part of the object,
   the sequence setting means includes
      designation accepting means for displaying a setting screen on which an image based on the model data registered in the model storing means appears, and which allows the process items registered in the process item registering means to be selected, the designation accepting means accepting a first designating operation for setting a common process sequence to be executed throughout the object, a second designating operation for setting a section-specific process sequence relating to a section-specific process designating item in the common process sequence, and a third designating operation for designating a target section of the section-specific process by using the image based on the model data, and registration processing means for forming a correlation through the section-specific process designating item between the common process sequence set by the first designating operation and the section-specific process sequence set by the second designating operation, and registering the common process sequence and the section-specific process sequence correlated to each other into the sequence storing means, and for associating the section specifying information which indicates data in the model data and which corresponds to the target section designated by the third designating operation with the section-specific process designating item in the common process sequence, and registering the associated section specifying information into the section specifying information storing means, and the sequence executing means performs the process items one by one in the common process sequence registered in the sequence storing means, and when the time comes to perform the section-specific process designating item in the common process sequence, the sequence executing means specifies measurement data about the target section, from measurement data acquired as a result of a process item already performed, by using section specifying information associated with the section-specific process designating item, and executes the section-specific process sequence corresponding to the section-specific process designating item on the specified measurement data.

2. The image processing device according to claim 1, wherein the registration processing means provides the section-specific process designating item in the common process sequence, or a section-specific process sequence corresponding to the section-specific process designating item with a link with section specifying information registered in the section specifying information storing means, thereby associating the section specifying information and the section-specific process designating item with each other.

3. The image processing device according to claim 1, wherein, the registration processing means registers the common process sequence and the section-specific process sequence on condition that the common process sequence set by the first designating operation determines that a process item by which measurement data in a format corresponding to the format of the model data is acquired is to be performed before the section-specific process designating item.

4. The image processing device according to claim 1, wherein:
the model storing means includes three-dimensional information about the three-dimensional shape of the object that is registered as model data; and
the designation accepting means displays a setting screen containing an image that is generated as a result of perspective transformation of the model data registered in the model storing means onto a virtual plane.

5. The image processing device according to claim 4, wherein:
the model data contains a plurality of segments each of which is an aggregate of a plurality of three-dimensional coordinates; and
the designation accepting means accepts designation of at least one segment as a target section of the section-specific process.

6. An image processing method comprising:
a sequence registering step for setting a process sequence in which a plurality of process items selected from process item registering means are arranged in a predetermined order in response to a user's designating operation, and registering the process sequence, in the process item registering means process items of a plurality of types and corresponding programs being registered, the process items and the programs being associated with each other; and
a sequence executing step for executing programs corresponding to the process items in the process sequence registered in the sequence registering step in an order set in the process sequence, thereby performing a plurality of processes including acquisition of an image of an object and measurement by using the acquired image, wherein the sequence registering step includes
a step for displaying a setting screen on which an image based on model data indicating the entire shape of the object appears, and which allows a plurality of process items including a section-specific process designating item determining that a section-specific process on part of the object is to be performed to be selected, and accepting a first designating operation to set a common process sequence to be executed throughout the object on the setting screen, whereby the common process sequence is set that determines that a process item by which measurement data in a format corresponding to the format of the model data is acquired is to be performed before the section-specific process designating item;
a step for accepting a second designating operation and a third designating operation on the setting screen, the second designating operation setting a section-specific process sequence relating to a section-specific process designating item in the common process sequence, the third designating operation designating a target section of the section-specific process by using an image based on the model data, and
a step for forming a correlation through the section-specific process designating item between the common process sequence set by the first designating operation and the section-specific process sequence set by the second designating operation, and registering the common process sequence and the section-specific process sequence correlated to each other, and associating section specifying information which indicates data in the model data and corresponds to the target section designated by the third designating operation with a section-specific process designating item in the common process sequence, and registering the associated section specifying information, and
in the sequence executing step, the process items set in the common process sequence are performed one by one while when the time comes to perform the section-specific process designating item in the common process sequence, measurement data about the target section is specified, from measurement data in a format corresponding to the format of the model data, by using section specifying information associated with the section-specific process designating item, and the section-specific process sequence corresponding to the section-specific process designating item is executed on the specified measurement data.

* * * * *